United States Patent

[11] 3,596,359

| [72] | Inventor | Michio Fukano<br>Yokohama-shi, Japan |
|---|---|---|
| [21] | Appl. No. | 784,321 |
| [22] | Filed | Dec. 17, 1968 |
| [45] | Patented | Aug. 3, 1971 |
| [73] | Assignee | Kabushikikaisha Tokyo Keiki Seizosho<br>(Tokyo Keiki Seizosho Co., Ltd.)<br>Tokyo, Japan |
| [32] | Priority | July 9, 1968 |
| [33] | | Japan |
| [31] | | 43/48038 |

[54] MERIDIAN DETECTOR
1 Claim, 6 Drawing Figs.

[52] U.S. Cl. ................................................. 33/72,
33/226, 74/5.5
[51] Int. Cl. .................................................. G01c 19/38
[50] Field of Search .......................................... 33/226, 72
G; 74/5.5

[56] References Cited
UNITED STATES PATENTS

| 1,309,409 | 7/1919 | Henderson | 33/226 |
| 1,895,628 | 1/1933 | Anschutz-Kaempfe | 33/226 |
| 3,162,951 | 12/1964 | Hintze et al. | 33/72 (G) |
| 3,229,376 | 1/1966 | Wilcox | 33/226 |
| 3,290,787 | 12/1966 | Brugger | 33/226 |
| 3,452,444 | 7/1969 | Hojo | 33/226 |

FOREIGN PATENTS

| 312,395 | 9/1914 | Germany | 33/226 |

Primary Examiner—Robert B. Hull
Attorney—Hill, Sherman, Meroni, Gross & Simpson

ABSTRACT: A device for determining the position of a meridian which includes a gyroscope mounted on a horizontal axis and which is supported so that it tends to point north. The gyroscope is suspended on a suspension wire and the torque in the suspension wire is balanced with the north-seeking action of the gyro rotor. The torsion in the suspension wire is removed by rotating the gyro case and thus aligning the spin axis of the gyro with true north. A disc is attached to the case of the gyroscope and is immersed in a viscous liquid so as to damp the north-seeking action of the gyroscope. The elevation of the container for the viscous liquid is adjustable to vary the degree of immersion of the disc, which is downwardly tapered so as to vary the damping torque with the degree of immersion.

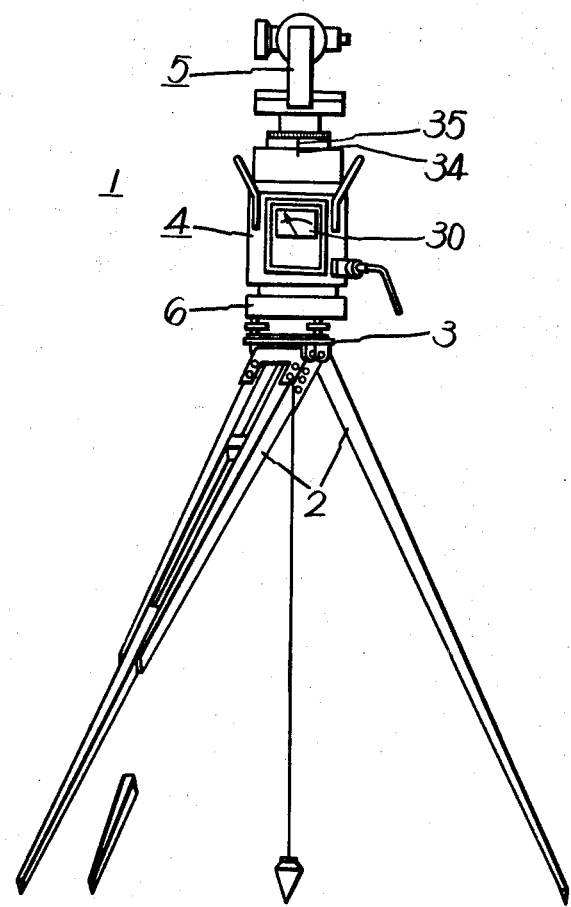

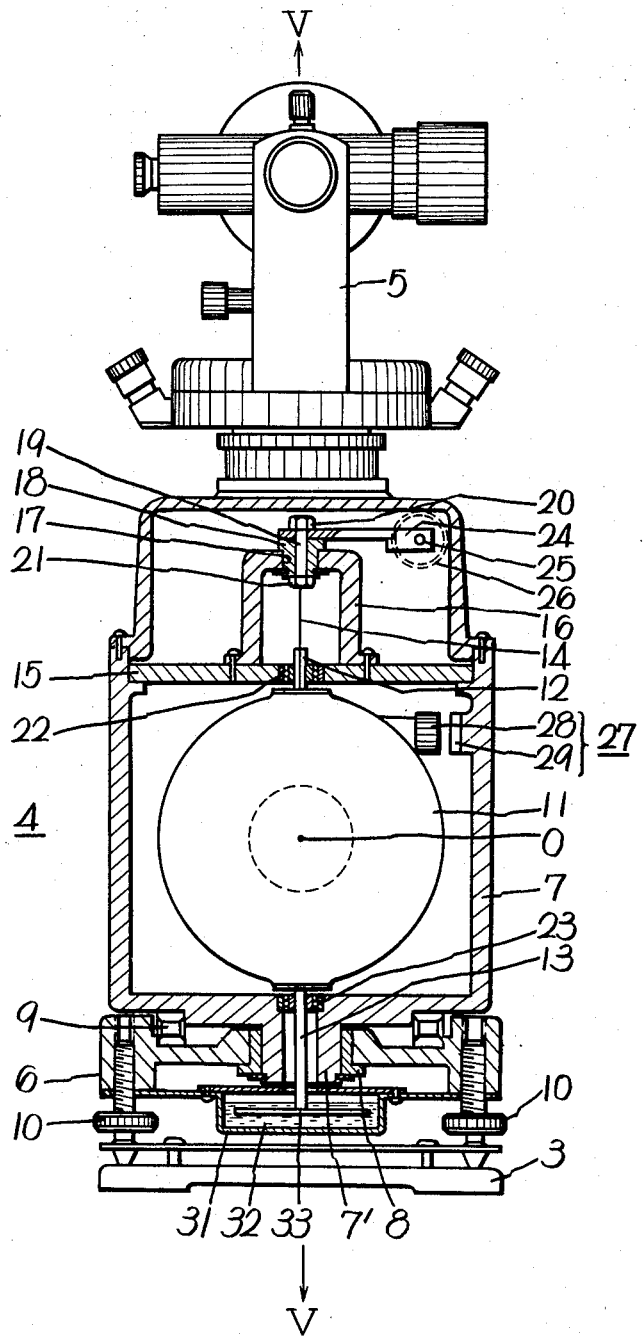

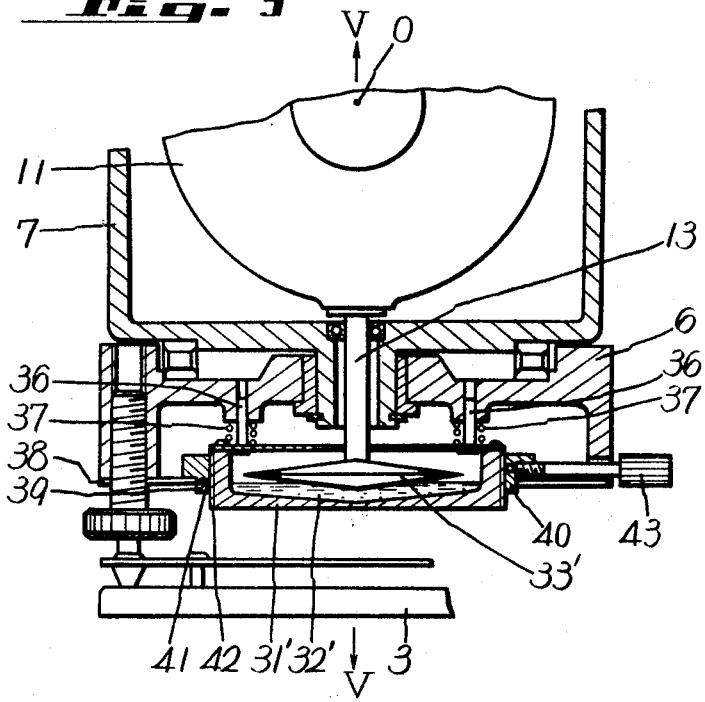
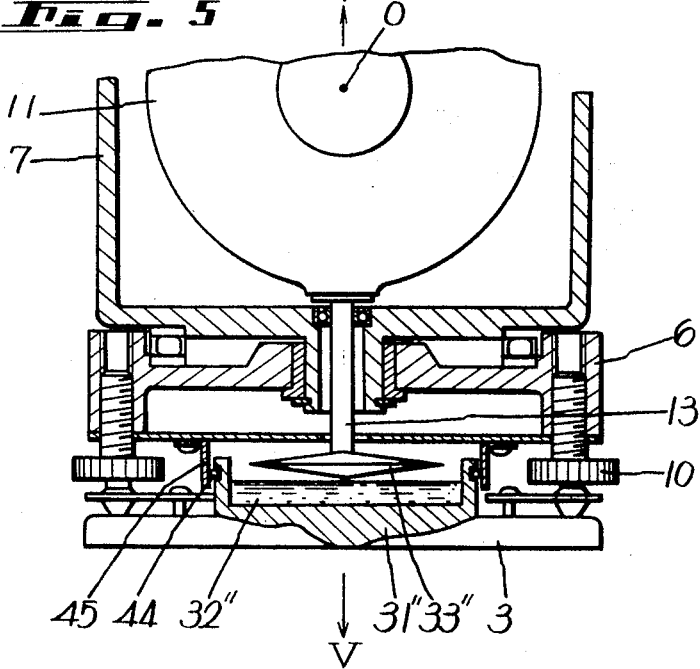

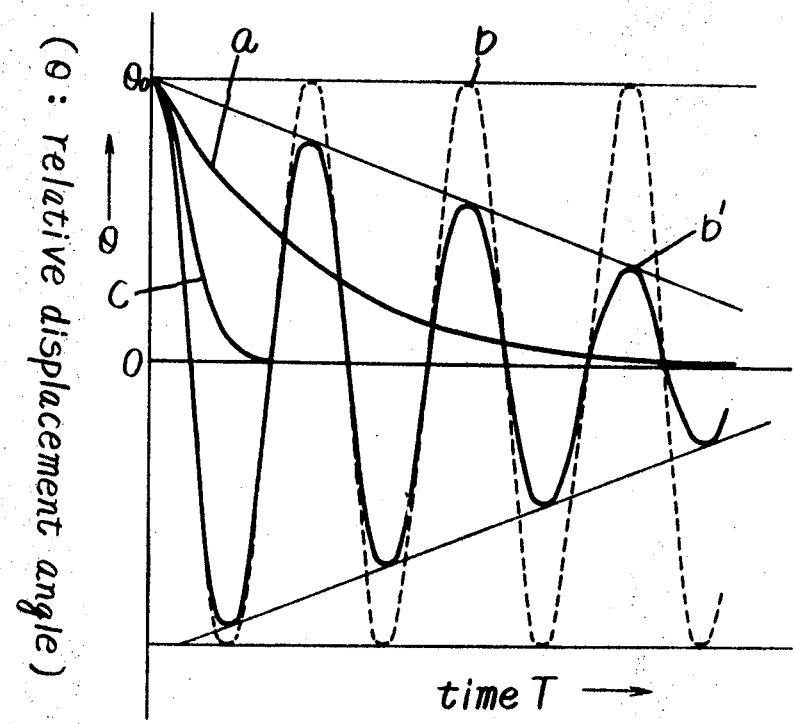

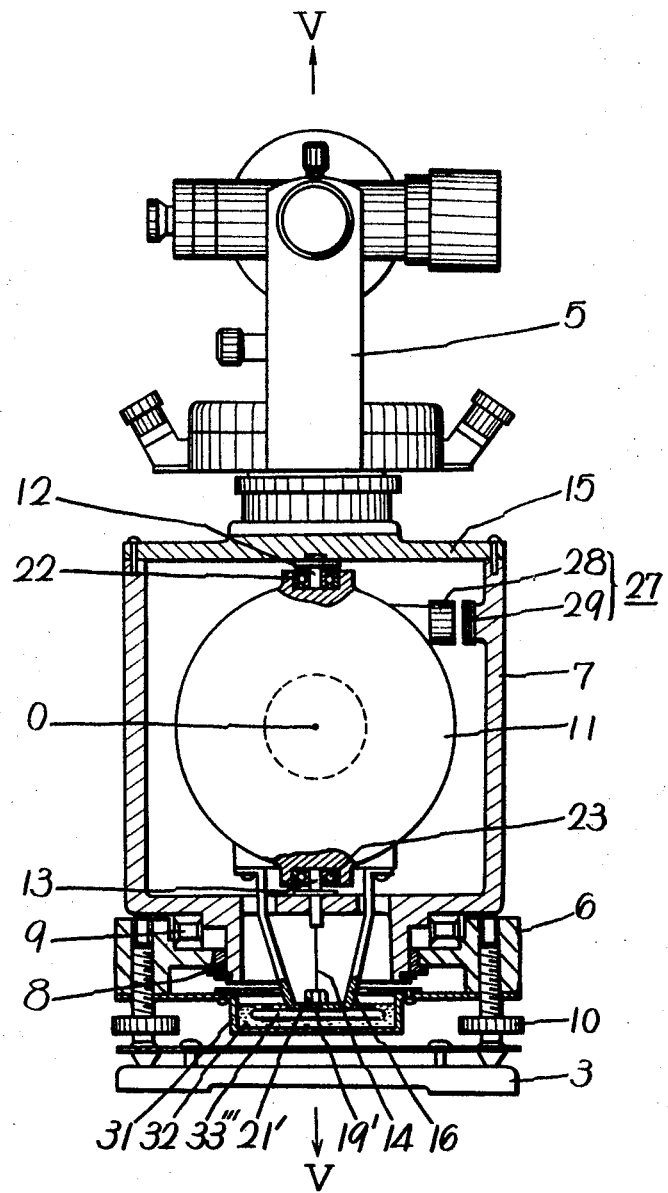

3,596,359

MERIDIAN DETECTOR

BACKGROUND OF THE INVENTION

1. Field of the Invention

The present invention relates to a meridian detector with high precision for determining the azimuth of the meridian on the earth for land surveying purpose and more particularly to an improved meridian detector having employed a gyroscope for precisely determining the azimuth of the meridian without astronomical observation.

2. Description of the Prior Art

According to the prior art device of land surveying, the meridian is usually found by astronomical observation, but it is not possible to make astronomical observations during rainy or overcast weather, much less under the ground for tunnelling, subway construction or the like. In such cases, the meridian can not be determined by the prior art device.

SUMMARY OF THE INVENTION

An object of the present invention is to provide a meridian detector that may be used for land surveying and which does not require astronomical observations.

In the meridian detector of the present invention, a gyrocompass is employed for utilizing the meridian-detecting characteristic of the gyrocompass. That is, according to the meridian detector of the present invention the gyrocompass is supported in such a manner that the spin axis of a gyro lies in the horizontal plane and the meridian direction is determined by orienting the gyroscope so that torque for returning to the north of its spin axis is removed.

Another object of the present invention is to provide a meridian detector in which a viscous liquid damper is provided in a container fixed to a stationary part (fixed part) free from the outer case for preventing external force due to the rotation of the outer case from being exerted on the gyro case, so that the gyro rapidly comes to a new balancing point after the outer case is rotated and accordingly, the meridian can be easily and rapidly detected with high precision.

Still another object of the present invention is to provide a meridian detector in which a viscous liquid damper contained in a container fixed to a stationary part, is varied in its effective viscosity so as to compensate for the viscosity change of the liquid damper due to temperature variation.

A further object of the present invention is to provide a meridian detector including a suspension wire and in which the device is damped with a viscous fluid.

BRIEF DESCRIPTION OF THE DRAWINGS

FIG. 1 is a diagram schematically illustrating one embodiment of the meridian detector according to the present invention placed on a tripod;

FIG. 2 is a side view of one embodiment of the meridian detector of the present invention with one portion shown in cross section;

FIG. 3 is a fragmentary view illustrating the damper portion of one embodiment of the meridian detector according to the present invention with one portion being shown in cross section;

FIG. 4 is a graph illustrating the damping characteristics of the meridian detector according to the present invention;

FIG. 5 is a fragmentary view illustrating another example of the damper portion of the meridian detector according to the present invention with one portion being shown in cross section; and FIG. 6 is a side view of another embodiment of the meridian detector according to the present invention with one portion being shown in cross section.

DESCRIPTION OF THE PREFERRED EMBODIMENTS

In FIG. 1, reference numeral 1 designates one embodiment of the meridian detector according to the present invention as a whole. Reference numeral 2 represents a tripod on which the meridian detector 1 is placed. On a base 3 of the tripod 3, a device proper 4 which is a main part of the present invention is disposed. On the device 4 a transit 5 is disposed.

With reference to FIG. 2, the device proper 4 will be explained in detail. In FIG. 2 reference numeral 6 designates a fixed baseplate. A bearing 8 is attached to an aperture bored in the fixed base plate 6 at its central portion. Reference numeral 7 designates an outer case. A cylindrical projection 7' of the outer case 7 is inserted to the bearing 8 and rotatably supported. A thrust bearing 9 is interposed between the fixed baseplate 6 and the outer case 7 for supporting the weight of the portions above the thrust bearing 9. Three adjusting screws 10 are attached to the fixed baseplate 6 on, for example, a circle with an equiangular distance therebetween, the center of the circle being intersected by the axis V-V which coincides with the direction of gravity, namely to the vertical direction by suitably controlling the adjusting screws 10. In this case, the free end of each adjusting screw 10 contacts with the upper surface of the base 3. In the outer case 7, there is disposed a gyrocase 11 having supported therein a gyro rotor the spin axis $O$ of which intersects the axis V-V at right angles and is on the plane perpendicular to the plane of the sheet of the drawing. In this case, the gyrocase 11 is so suspended therein that the gyrocase 11 can be rotatable about the axis V-V with respect to the outer case 7. That is, vertical shafts 12 and 13 are respectively attached to the gyrocase 11 at the upper and lower portions thereof, the axis of the vertical shafts 12 and 13 being aligned on the same axis, and one end of a suspension wire 14 which may be a piano wire for applying a suitable return force is attached to the free end of the vertical shaft 12. A supporting plate 15 is fixed to the outer case 7 above the gyrocase 11 and within the outer case 7. A support 16 having a substantially U-shaped configuration in cross section is fixed to the supporting plate 15 on the upper side thereof. In this case the longitudinal axis of the support 16 substantially coincides with the axis V-V. An aperture 17 is centrally bored in the upper end portion of the support 16. A bolt 19 is screwed into the aperture 17 through a collar 18 and is rotatably supported by nuts 20 and 21. To the lower end of the bolt 19 the other end of the suspension wire 14 is fixed to suspend the gyrocase 11 within the outer case 7 and below the supporting plate 15. In this case, all the axes of the bolt 19, the suspension wire 14 and the vertical shafts 12 and 13 are aligned with one another and with the axis V-V. Suitable bearings 22 and 23 are provided in the supporting plate 15 and the lower end portion of the outer case 7 where the vertical shafts 12 and 13 pass therethrough respectively, whereby frictions therebetween can be minimized. Reference numeral 24 designates an arm one end of which is attached to the bolt 19 at its upper portion. Reference numeral 25 represents an adjusting bolt which is rotatably attached to the outer case 7. To the projected end of the adjusting bolt 25 from the outer case 7 a knob 26 is fixed. The free end (namely the end projected into the inner side of the outer case 7) of the adjusting bolt 25 is contacted with the free end portion of the arm 24 so that the arm 24, namely the bolt 19 can be rotated by rotating the knob 26, whereby the suspension wire 14 is rotated. Reference numeral 27 designates a noncontact type deviation detecting means for detecting the rotational deviation of the gyrocase 11 about the axis V-V relative to the outer case 7. The detecting means 27 consists of two elements 28 and 29. The element 28 is attached to the gyrocase 11 on the outer surface thereof and the element 29 is attached to the outer case 7 on the inner surface thereof at the position corresponding to that of the gyrocase 11 where the element 28 is attached. The detecting means 27 may be in the form of, for example, a differential transformer, so that the elements 28 and 29 can take the form of a magnetic core having a coil wound thereon. The relative deviation between the gyrocase 11 and the outer case 7 detecting means 27 can be observed by an indicator 30 shown in FIG. 1, the indicator 30 being disposed outside, for example, the outer case 7.

In the present invention, a container 31 is fixed to the baseplate 6 under the base plate, the container 31 having a viscous liquid 32 therein. A rotary member 33 attached to the free end of the lower vertical shaft 13 is immersed in the viscous liquid 32 so that damping action for the rotation of the gyrocase 11 can be effected by the viscous liquid 32 through the rotary member 33.

The operation of the meridian detector of the present invention is accomplished by adjusting the relative deviation between the gyrocase 11 and the outer case 7 to be substantially zero.

Firstly, by adjusting the screws 10 the outer case 7 is arranged substantially vertical, that is, the axes of the vertical shafts 12 and 13, the suspension wire 14 and the bolt 19 (the axis V-V) are aligned with the direction of the gravity. Then the indication of the indicator 30 is made zero, that is, the relative deviation between the gyrocase 11 and the outer case 7 is made zero by rotating the knob 26, which will mean that thereafter these adjustments, if the gyrorotor is rotated at a predetermined high speed the spin axis $O$ of the gyrorotor has a north-seeking action due to the direction of gravity acting upon the weight of the gyrorotor. That is, the spin axis $O$ of the gyrorotor is attracted to the true north of the earth, namely to the direction of the meridian. In accordance with the rotation of the spin axis $O$, the gyrocase 11 rotates the axis V-V and the suspension wire 14 is twisted. The gyrocase 11 settles at the position where the return torque of the suspension wire 14 balances with the torque of the gyrocase 11 due to the north-seeking action of the gyrorotor. The rest position can be detected by the detecting means 27 which is shown by the indicator 30 as a relative deviation between the gyrocase 11 and the outer case 7. In this condition, however, the spin axis $O$ of the gyrorotor does not coincide with the true north, because there exists a torsion in the suspension wire 14. Case 7 is rotated about the axis V-V manually so that the relative deviation between the outer case 7 and the gyrocase 11 detected by the detecting means 27 becomes zero, namely the indication of the indicator 30 becomes the first position (zero), which will mean that there is no torsion in the suspension wire 14, whereby the spin axis $O$ of the gyrorotor substantially coincides with the true north. After this, the outer case 7 is fixed with respect to the fixed baseplate 6. In this case, a base line 34 of the outer case 7 shown in FIG. 1 accurately coincides with the meridian and is aligned therewith. Accordingly, the azimuth of an object can be directly obtained on the azimuth scale provided on the transit 5 by aligning a base line 35 of the transit 5 with the base line 34 of the outer case 7.

With reference to FIG. 3 another example of the damping device utilizing a liquid according to the present invention will be described, in which the effective torque due to viscosity of the liquid exerted on the rotary member is varied.

As has been explained in the meridian detector of the present invention the outer case 7 is rotated to remove the relative deviation between the gyrocase 11 and the outer case 7 before the rotor is revolved. In this case, although the rotary member 33' is immersed in the viscous liquid 32', rather a long time is required for the gyrocase 11 to be stabilized and there is a fear that the adjustment can not be attained correctly. In the example shown in FIG. 3, the container 31' is attached to the fixed baseplate 6 in such a manner that the container 31' can be moved up and down along the direction of the axis V-V. Accordingly, the area of the rotary member 33', attached to the lower end of the vertical shaft 13, contacting with the viscous liquid 32' can be suitably adjusted so that the effective torque due to viscosity of the liquid 32 exerted on the rotary member 33' is varied to change the characteristics of the control of the device. As a result of this, the adjustment of the relative deviation between the gyrocase 11 and the outer case 7 can be easily and correctly attained within a short time.

The construction of the embodiment shown in FIG. 3 is explained in detail. The container 31' is attached to the fixed baseplate 6 by means of guide pins 36. In this case, the container 31' can be moved up and down along the axis V-V but can not be rotated about the axis V-V. Reference numeral 37 designates springs each being disposed between the baseplate 6 and the container 31' surrounding the guide pin 36 for normally biasing the container 31' away from the fixed baseplate 6. Reference numeral 38 designates a plate which has bored therein at its central portion an opening 39 and which is fixed to the fixed baseplate 6. A rotary ring 40 is attached to the slate 38 by screw thread 41. Reference numeral 42 is a screw thread formed on the outer periphery of the container 31'. The container 31 is screwed into the rotary ring 40. Reference numeral 43 is a lever one end of which is fixed to the rotary ring 40 at the outer side thereof and the other end portion of which is protruded beyond the outside of the fixed baseplate 6. The lever 43 is also arranged to rotate about the axis V-V.

With the above embodiment when the lever 43 is rotated, the rotary ring 40 is rotated in accordance with the rotation of the lever 43 to move the container 31' up and down, whereby the effective torque due to viscosity of the viscous liquid 32' exerted upon the rotary member 33' can be controlled. In this case if the configuration of the rotary member 33' is formed in such a manner that the contacting area of the rotary member 33' with the viscous liquid 32' is varied in accordance with the degree of immersion of the rotary member 33' in the viscous liquid 32', for example member 33' is formed in a rhombus of rotation as shown in the figure. The area of the rotary member 33' contacting viscous liquid 32' is varied in accordance with the change of the level of the viscous liquid 32' caused by the movement of the container 31', so that the apparent viscosity of the viscous liquid 32' can be varied to change the viscous friction.

FIG. 4 is a graph illustrating the vibration characteristics of the rotary member and in which the ordinate designates the relative deviation angle $\theta$ between the gyrocase 11 and the outer case 7 and the abscissa the time T from starting time of adjustment of the apparatus to standstill time of the apparatus. In the graph, a curve $a$ illustrates a case where the rotary member 33 is completely immersed to the viscous liquid 32, which is a so-called critical attenuation characteristic. In such case, it takes a relatively long time for the gyrocase 11 to stop. A dotted line curve $b$ shows a case where the rotary member 33 is completely free from the viscous liquid 32, in which the rotary member 33, of course, is completely free from the viscous friction of the viscous liquid 32 and accordingly oscillates freely. In this case, the gyrocase is unstable. A curve $c$ shows a case where the relationship between the rotary member 33 and the viscous liquid 32 is adjusted in the most preferable characteristics of controlling the oscillation. In practice the case having the characteristics of the curve $b$ does not exist due to the existence of friction but the rotary member 33 oscillates as in a curve $b'$ in FIG. 4.

In general, it is very difficult in consideration of temperature variation and external disturbances to always maintain a conventional apparatus in the condition that it oscillates in accordance with the curve $c$. Meanwhile, it is very difficult, to form the apparatus having the characteristics as shown by the curve $c$ with employment of a fixed damper. That is, a conventional apparatus requires much time before the apparatus may be used for measuring purposes.

The apparatus according to the present invention is free from the defects listed above.

FIG. 5 is a sectional view illustrating another example of the meridian detecting apparatus according to the present invention in which numerals similar to the numerals of the embodiment shown in FIG. 3 represent the same elements.

In this example, the effect set forth above can be obtained without especially providing the mechanism moving the surface of the viscous liquid 32' up and down. That is, the container 31' having contained therein the viscous liquid 32' is directly fixed to the base 3. In this case, by rotating the adjusting screws 10 the fixed baseplate 6 and the outer case 7, namely the rotary member 33' can be moved up and down with respect to the viscous liquid 32' so that the effective torque due to viscosity of the viscous liquid 32' exerted on the rotary member 33' can be varied. Further, it is possible to form a recess for containing the viscous liquid 32' instead of the container 31' with the same effect as in the case of providing the container 31'.

In this example, reference numeral 44 designates a packing, for example, a 0-shaped ring disposed between the outer periphery of the container 31' and a supporter 45 fixed to the baseplate 6 for preventing the liquid 32' from being split therefrom.

The example in FIG. 5 illustrates a very simple construction in which there are provided no container and special complicated mechanism for moving the container up and down to change the effective viscosity of the liquid.

With reference to FIG. 6, still another example of the present invention will be explained for providing a meridian detector small in size and lighter in weight in which reference numerals similar to those of the foregoing examples designate similar components.

In this example, the bearings 22 and 23 are directly mounted on the gyrocase 11 at the upper and lower positions thereof respectively. The vertical shafts 12 and 13 are respectively supported by the bearings 22 and 23 so that the gyrocase 11 is supported rotatably about the axis V-V. The support 16 is directly attached to the gyrocase 11 at the lower portion thereof. One end of the suspension wire 14, the other end of which is fixed to the free end of the lower vertical shaft 13, is fixed to a bolt 19' attached to the support 16 through an aperture bored in the bottom of the support 16 by a nut 21'. The lower vertical shaft 13 suspends at the lower center of the outer case 7 the support 16, namely the gyrocase 11 by means of the suspension wire 14 to be rotated about the axis V-V with respect to the outer case 7. Accordingly, the suspension wire 14 can be twisted by rotating the vertical shaft 13. The vertical shaft 13 can be rotated by a device (not shown) provided in connection with the vertical shaft 13, which is similar to the device consisting of the arm 24 and the adjusting screw 25 as shown in FIG. 2. In this case since the rotary member 33' is directly attached to the bottom of the support 16 and is immersed in the viscous liquid 32, the rotation of thegyrocase 11 is subjected to the attenuating operation of the viscous liquid 32. Other construction and their operation are similar to those of the foregoing examples.

In the example shown in FIG. 6, since the gyrocase 11 is suspended by the suspension wire 14 even if the support 16 is disposed under the gyrocase 11, substantially no thrust load is applied to the vertical bearings 22 and 23. Thus no friction torque is applied to the vertical shafts 12 and 13, which will mean that a meridian detector of high accuracy can be provided.

Further, since the support 16 in this example also acts as a damper shaft the meridian detector may be small.

It will be, of course, possible in this example that the rotary member 33 can be made with the configuration such as shown in FIG. 3 and 5.

As apparent from the foregoing, in the present invention the liquid damper is provided on a fixed or stationary part free from the outer case 7 and the characteristic of attenuation is variable so that the detection of the meridian can be practiced in the most favorable condition. Therefor, according to the present invention the meridian can be easily obtained, in short time and with high accuracy.

Further, it will be possible in the present invention to remove the vertical bearings for increasing the accuracy of the meridian detector for deleting friction generated between the bearings and the shafts.

Although illustrative embodiments of the invention have been described in detail herein with reference to the accompanying drawings, it is to be understood that the present invention is not limited to those precise embodiments, and that various changes and modifications may be made therein by one skilled in the art without departing from the scope or spirit of the present invention as defined in the appended claims.

I claim:

1. A meridian detector comprising an outer case rotatably mounted on a stationary part for rotation about an axis of said outer case, a pair of spaced bearing means aligned along said axis, a gyrocase having a gyrorotor supported therein, first and second shafts for supporting said gyrocase mounted in said pair of bearing means respectively, means for detecting the position of said gyrocase relative to said outer case, means disposed on said outer case for surveying an azimuth of an object to be surveyed with respect to said outer case, means disposed on said stationary part in connection with one of said first and second shafts for damping the rotation of said gyrocase, said damping means comprising a container mounted on said stationary part, viscous liquid contained in said container and a plate secured to said one of said first and second shafts and immersed in said viscous liquid, said plate being formed in such a manner that the area of section of said plate perpendicular to the axis of said one shaft is varied gradually and said container being movable in the direction of said axis, whereby the damping characteristic of said damping means can be changed, and means for moving said container in a direction to vary the degree of immersion of said plate.

UNITED STATES PATENT OFFICE
CERTIFICATE OF CORRECTION

Patent No. 3,596,359          Dated August 3, 1971

Inventor(s)    MICHIO FUKANO

It is certified that error appears in the above-identified patent and that said Letters Patent are hereby corrected as shown below:

Column 3, line 23, delete "thereafter" and substitute the following therefor --there is substantially no torsion in the suspension wire 14 and the gyrocase 11 and the outer case 7 are arranged at a predetermined relative position. After-- .

Column 4, line 12, "slate" should read --plate--;

line 14, "31" should read --31'--;

line 41, "to" should read --in--.

Signed and sealed this 20th day of June 1972.

(SEAL)
Attest:

EDWARD M. FLETCHER, JR.
Attesting Officer

ROBERT GOTTSCHALK
Commissioner of Patents